(12) United States Patent
Crane

(10) Patent No.: US 9,445,657 B2
(45) Date of Patent: Sep. 20, 2016

(54) WEARABLE REFLECTIVE DEVICE

(71) Applicant: Crane IP Pty Ltd, Runaway Bay (AU)

(72) Inventor: Raymond Phillip Crane, Runaway Bay (AU)

(73) Assignee: Crane IP Pty Ltd, Runaway Bay (AU)

( * ) Notice: Subject to any disclaimer, the term of this patent is extended or adjusted under 35 U.S.C. 154(b) by 22 days.

(21) Appl. No.: 14/354,312

(22) PCT Filed: Oct. 26, 2012

(86) PCT No.: PCT/AU2012/001314
§ 371 (c)(1),
(2) Date: Apr. 25, 2014

(87) PCT Pub. No.: WO2013/059880
PCT Pub. Date: May 2, 2013

(65) Prior Publication Data
US 2014/0300981 A1    Oct. 9, 2014

(30) Foreign Application Priority Data

Oct. 27, 2011    (AU) .................................. 2011904457

(51) Int. Cl.
| | |
|---|---|
| *A45D 42/06* | (2006.01) |
| *B62J 29/00* | (2006.01) |
| *G02B 7/00* | (2006.01) |
| *G02B 7/182* | (2006.01) |
| *A45D 42/12* | (2006.01) |

(52) U.S. Cl.
CPC ................ *A45D 42/06* (2013.01); *B62J 29/00* (2013.01); *G02B 7/002* (2013.01); *G02B 7/1822* (2013.01); *A45D 42/12* (2013.01)

(58) Field of Classification Search
CPC ....... A45D 42/06; A45D 42/12; B62J 29/00; G02B 7/002; G02B 7/1822

USPC ......................................................... 359/879
See application file for complete search history.

(56) References Cited

U.S. PATENT DOCUMENTS

| | | | | |
|---|---|---|---|---|
| 2,184,060 | A |    | 12/1939 | Singer |
| 4,054,375 | A | * | 10/1977 | Ribeca ...................... B62J 29/00 |
|           |   |   |         | 359/842 |
| 5,499,468 | A | * | 3/1996 | Henry ...................... G09F 3/005 |
|           |   |   |         | 40/633 |
| 5,623,731 | A | * | 4/1997 | Ehrgott .............. A41D 19/0027 |
|           |   |   |         | 2/160 |
| 6,120,157 | A |    | 9/2000 | Westover |
| 6,673,029 | B1 | * | 1/2004 | Watson ................... A61F 13/04 |
|           |    |   |        | 602/6 |
| 2008/0259477 | A1 | * | 10/2008 | Gorton ...................... A45F 5/02 |
|              |    |   |         | 359/879 |
| 2009/0283047 | A1 | * | 11/2009 | Swenson .............. A01K 5/0114 |
|              |    |   |         | 119/61.55 |

(Continued)

FOREIGN PATENT DOCUMENTS

| | | |
|---|---|---|
| CN | 101859092 B | 10/2011 |
| DE | 4130034 A1 | 4/1993 |

(Continued)

*Primary Examiner* — Bumsuk Won
*Assistant Examiner* — Grant Gagnon
(74) *Attorney, Agent, or Firm* — Jill A. Jacobson

(57) ABSTRACT

A wearable reflective device. The wearable reflective device includes a mirror, a base and a strap. The strap is attached to the base for securing the device to a user. The mirror is connected to the base by a pivotal element and a rotational element, wherein the pivotal element is configured to allow the mirror to pivot along a first plane, the rotational element configured to allow the mirror and pivotal element to rotate in a second plane. The first plane is substantially orthogonal to the second plane.

19 Claims, 5 Drawing Sheets

(56) References Cited

U.S. PATENT DOCUMENTS

2011/0280111 A1* 11/2011 Romano .............. G04B 37/103
  368/290
2013/0046317 A1* 2/2013 Blumenkranz ........ A61B 19/22
  606/130

FOREIGN PATENT DOCUMENTS

| EP | 1454570 A1 | 10/2004 |
| JP | 9-164983 A | 6/1997 |
| JP | 3051753 U | 9/1998 |
| WO | 2013/059880 A1 | 5/2013 |

* cited by examiner

WEARABLE REFLECTIVE DEVICE

CROSS-REFERENCE TO RELATED APPLICATIONS

This application is a U.S. national stage application under 35 U.S.C. §371 of PCT/AU2012/001314, filed on Oct. 26, 2012 and published as WO2013/059880 A1 on May 2, 2013, which claims priority to Australian application no. 2011904457, filed on Oct. 27, 2011.

FIELD OF THE INVENTION

The present invention relates to safety devices, and in particular, although not exclusively, to a wearable reflective device.

BACKGROUND TO THE INVENTION

Cycling is a popular sport and pastime, and cycling as a means of transportation has become popular due to environmental and financial factors. Riding to work in city environments, in traffic and on busy pathways can, however, be hazardous.

A cyclist can improve his or her safety by having knowledge of their surroundings and by predicting behaviour of others. This can include being aware of vehicles or other cyclists that are approaching them from behind. Similarly, when racing, knowledge of a competitor's position can form an integral part of a cycling strategy.

It is thus common for cyclists to periodically turn their heads to look behind them. However looking back in this way has several disadvantages. Firstly, a cyclist's vision is completely taken off the path on which they are travelling. This can, for example, increase the risk of frontal collisions. Secondly, it is difficult for a cyclist to maintain a straight riding position as the cyclist is typically unable to rotate his or her head 180 degrees without shoulder movement.

Attempts have been made to reduce the disadvantages of the prior art through the use of rear view mirrors.

There exists rear view mirrors of the prior art that are designed to be mounted directly to a bicycle handlebar. Such mirrors are attached to the handlebars by an extended arm, so that the mirror is raised to a suitable position.

A problem with handlebar mounted mirrors is that they are unsteady and are blurred by vibrations of the bicycle, for example on a rough surface such as a typical road. A further problem with handlebar mounted mirrors, is that they are bulky because of the extended arm, and accordingly are both prone to damage and prone to cause injury to the cyclist and/or others in the event of an accident.

Furthermore, there exist mirrors that are designed to be mounted to a cyclist's helmet. A problem with such helmet mounted mirrors is that they require the use of certain types of helmets and/or require modification to a helmet. Additionally, the helmet mounted mirrors can impair movement of a cyclist and cause further injury in case of an accident.

Accordingly, there is a need for an improved safety device.

OBJECT OF THE INVENTION

It is an object of some embodiments of the present invention to provide consumers with improvements and advantages over the above described prior art, and/or overcome and alleviate one or more of the above described disadvantages of the prior art, and/or provide a useful commercial choice.

SUMMARY OF THE INVENTION

According to a first aspect, the invention resides in a wearable reflective device including:
 a mirror;
 a base; and
 a strap attached to the base for securing the device to a user;
 the mirror connected to the base by a pivotal element and a rotational element, wherein:
 the pivotal element is configured to allow the mirror to pivot along a first plane, the rotational element configured to enable the mirror and pivotal element to rotate in a second plane, the first plane being substantially orthogonal to the second plane.

Preferably, the strap is adjustable to fit a user.

Preferably, the mirror comprises a polished aluminium surface.

Preferably, the pivotal element comprises a hinge.

Preferably, the rotational element comprises an annular channel along which one or more protrusions can travel.

Preferably, the one or more protrusions comprise an annular protrusion.

Preferably, the base comprises a cavity for receiving the reflective surface.

Preferably, the strap comprises a sleeve for receiving a medical information sheet.

Preferably, the strap includes an identifier identifying a presence of the medical information sheet.

Preferably, the strap is attached to the base using a hook and loop fastener and a channel of the base.

Preferably, the strap defines a plurality of apertures, extending from a first side of the strap to a second side of the strap.

Preferably, a lower surface of the base is curved.

Preferably, the base comprises a plurality of hexagonal apertures.

According to a second aspect, the invention resides in a wearable reflective device including:
 a mirror;
 a base comprising a cavity for receiving the mirror; and
 a coupling member, connecting the mirror to the base, the coupling member enabling the mirror to move between first and second positions, the reflective surface protected by the cavity in the first position and exposed in the second position.

BRIEF DESCRIPTION OF THE DRAWINGS

To assist in understanding the invention and to enable a person skilled in the art to put the invention into practical effect, preferred embodiments of the invention are described below by way of example only with reference to the accompanying drawings, in which:

FIG. 5b illustrates a bottom view of the strap of FIG. 5a; and

FIG. 5c illustrates an enlarged side view of an end portion of the strap of FIG. 5a.

Figure 1:
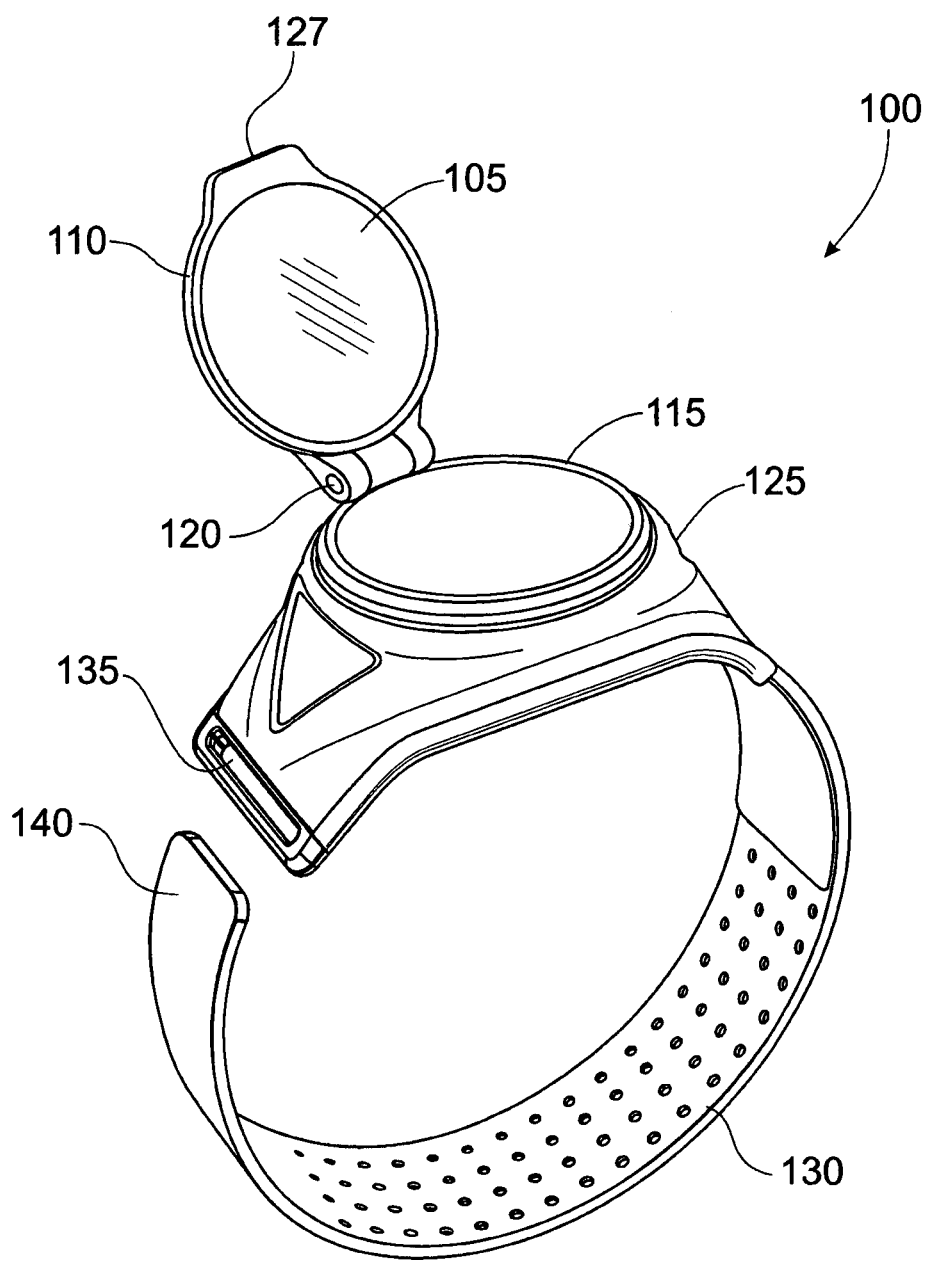
FIG. 1 illustrates a wearable reflective device for mounting to an arm of a user, according to an embodiment of the present invention.

Those skilled in the art will appreciate that minor deviations from the layout of components as illustrated in the drawings will not detract from the proper functioning of the disclosed embodiments of the present invention.

DETAILED DESCRIPTION OF THE INVENTION

Embodiments of the present invention comprise wearable reflective devices. Elements of the invention are illustrated in concise outline form in the drawings, showing only those specific details that are necessary to the understanding of the embodiments of the present invention, but so as not to clutter the disclosure with excessive detail that will be obvious to those of ordinary skill in the art in light of the present description.

In this patent specification, adjectives such as first and second, left and right, front and back, top and bottom, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

The reference to any prior art in this specification is not, and should not be taken as, an acknowledgement or any form of suggestion that the prior art forms part of the common general knowledge.

According to one aspect, the invention resides in a wearable reflective device including: a mirror; a base; and a strap attached to the base for securing the device to a user; the mirror connected to the base by a pivotal element and a rotational element, wherein: the pivotal element is configured to allow the mirror to pivot along a first plane, the rotational element configured to enable the mirror and pivotal element to rotate in a second plane, the first plane being substantially orthogonal to the second plane.

Advantages of certain embodiments of the present invention include an ability for a cyclist to view an environment behind them, without needing to turn their head or remove focus from their travelling direction for any substantial time, with increased visibility due to reduced vibration, and thus increased safety. Furthermore, certain embodiments of the present invention enable compact storage of the mirror when not in use, while retaining certain settings, such as angle of use, to enable simple and fast reconfiguration of the mirror when used again.

FIG. 1 illustrates a wearable reflective device 100 for mounting to an arm of a user, according to an embodiment of the present invention.

The wearable reflective device 100 includes a mirror 105, which enables the user to view objects out of their ordinary line of sight, by means of reflection. The mirror 105 can, for example, comprise a polished aluminium surface, reflective plastic, glass with a reflective backing, or any other suitable material.

The mirror 105 can be substantially flat, or can be convex in one or more directions. A convex mirror 105 has an advantage of enabling a wider field of view than a flat reflective surface, but has a disadvantage of distorting the field of view.

The mirror 105 is fixedly mounted to a cover 110, which is pivotally attached to a rotational element 115 by a hinge 120. The cover 110 includes a lip 127, which enables the user to lift the cover 110 to a suitable position. The cover 110 is releasably engagable into a base 125 or the rotational element 115 by a compressible lip or tabs (not shown), such that the cover 110 'clicks' shut.

Figure 2:
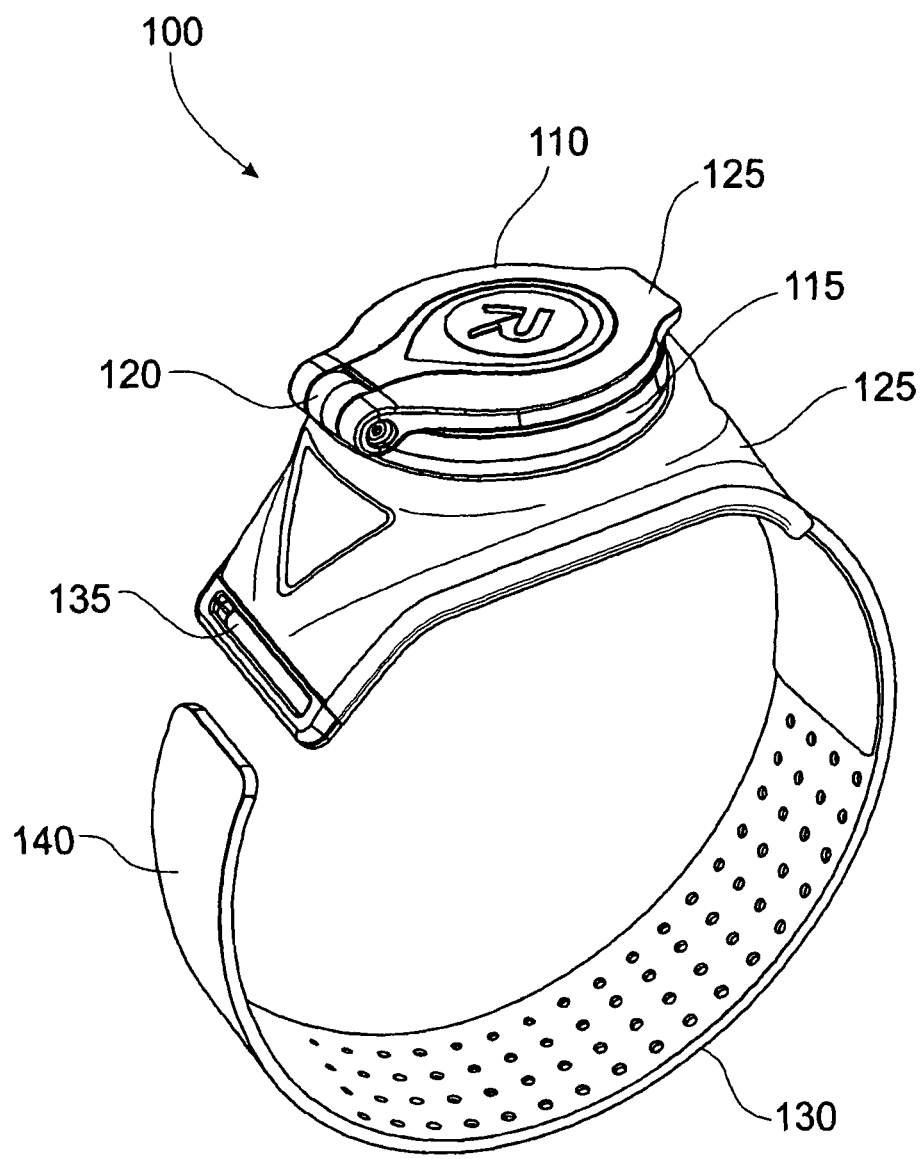
FIG. 2 illustrates the wearable reflective device of FIG. 1 with a cover shut.

The mirror 105 is mounted to an inner surface of the cover 110, such that the mirror 105 is enclosed by the cover 110 and the base 125 when the cover 110 is shut. Furthermore, when shut, the cover 110 is substantially flush with a base 125, and thus is protected from damage and from being caught on or injuring someone or something. FIG. 2 illustrates the wearable reflective device 100 with the cover 110 shut.

According to certain embodiments, the base 125 includes a cavity (not shown) which surrounds the cover 110 when shut, thus further protecting the mirror 105 and cover 110 from damage.

The base 125 can, for example, comprise injection moulded plastics, rubber or the like.

The wearable reflective device 100 further includes a strap 130, for securing the wearable reflective device 100 to an arm of the user. The strap 130 is for threading through a channel 135 of the base 125 and forms a sleeve together with the base 125 in which the users arm resides. The strap 130 can, for example, be one to two centimeters wide, as illustrated, to provide a compact design, or several centimeters wide, such as 10 cm wide, to provide stability when worn.

As discussed further below, the strap 130 comprises a hook and loop fastener which enables the strap 130 to be attached to itself. However, according to alternative embodiments, the strap 130 can comprise a buckle, or an elastic sleeve through which the users arm resides.

By pulling an end 140 of the strap 130 through the channel 135, the user is able to adjust a diameter of the sleeve which is formed by the strap 130, and thus adjust a size of the sleeve to suit the user.

According to certain embodiments, the strap 130 is sized to fit to an arm proper (brachium), also known as the upper arm, of the user. According to other embodiments, the strap 130 is sized to fit a forearm (antebrachium) or wrist (carpus) of the user. According to yet further embodiments, the wearable reflective device 100 comprises several interchangeable straps 130 to suit different applications.

Figure 3:
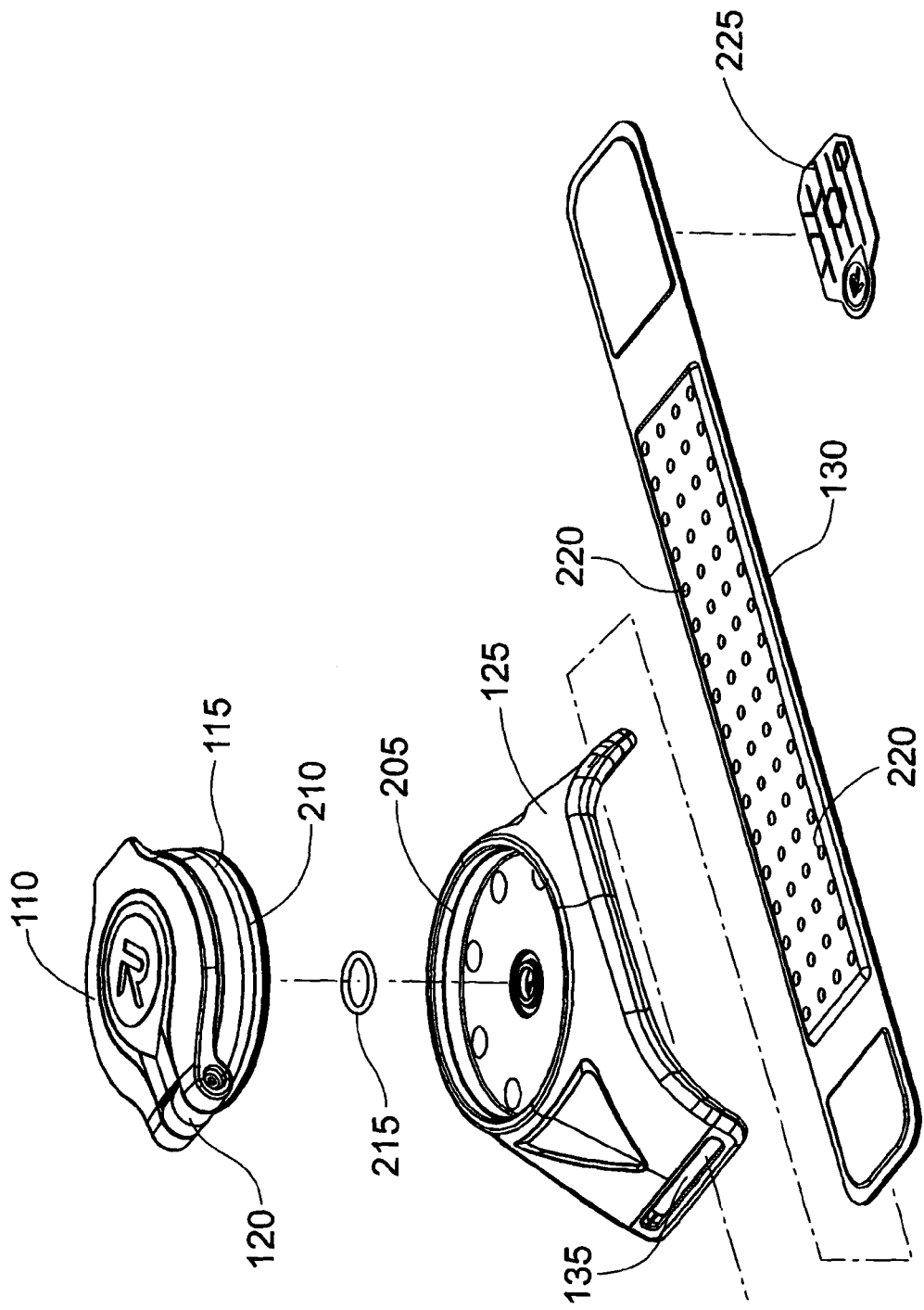
FIG. 3 illustrates an exploded view of the wearable reflective device of FIG. 1.

FIG. 3 illustrates an exploded view of the wearable reflective device 100.

As discussed above, the rotational element 115 enables the cover 110 to rotate relative to the base 125. This is achieved by an annular channel 205 in the base 125 to which an annular protrusion 210 of the rotational element 115 fits, such that the annular protrusion 210 travels along the annular channel 205 when rotated.

The rotational element 115 and the hinge 120 are able to function independently of each other. For example, the cover 110 can be raised and lowered by the hinge 120 without rotating the rotational element 115. A portion of the hinge 120 is formed by the rotational element 115, and thus rotates with rotation of the rotational element 115.

The rotational element 115 and the base 125 are separated by an o-ring 215, which provides smooth movement of the rotational element 115 with respect to the base 125. The o-ring 215 can be used to separate the base 125 and the rotational element 115 to avoid unwanted friction between the base 125 and the rotational element 115, and/or bias the rotational element 115 against the annular channel 205, to avoid unintentional rotation of the rotational element 115, for example from vibration.

Through use of the hinge 120 and the rotational element 115, the cover 110, and thus the mirror 105, is able to be positioned such that a suitable field of view is reflected to the user. In the case of bicycle riding, it is advantageous to have a field of view reflected that corresponds to a view behind the user, particularly when changing lanes. However, in other uses, it may be advantageous to set a field of view to, for example, correspond to a side of the user, above or below the user.

The hinge 120 provides a means to pivot the mirror 105 in a first plane, and the rotational element 115 enables rotation of the mirror 105 in a second plane. As the first and second planes are orthogonal, or substantially orthogonal to each other, the mirror 105 can be positioned in a wide range of positions. The hinge 120 provides vertical movement whereas the rotational element 115 enables 360 degree rotation.

A user is able to initially set the field of view using both the rotational element 115 and the hinge 120, and subsequently simply open and close the cover 110 without having to later adjust the rotational element 115. This enables the user to quickly shut and open the wearable reflective device 100 while being able to retain a rotational configuration of the wearable reflective device 100.

The strap 130 comprises a plurality of perforations 220, enabling air and moisture to flow through the strap 130. Furthermore, the strap 130 can be made of breathable, moisture permeable material, such that moisture is not trapped between a users skin and the strap 130.

According to certain embodiments, the wearable reflective device 100 further comprises a medical information sheet 225, for providing Emergency Contact details of the user. The medical information sheet 225 can comprise an ICE (In Case of Emergency) identification tag, and can include allergen information, or any other relevant information.

The medical information sheet 225 can include handwritten information, or be pre-printed with information relevant to the user.

The strap 130 comprises a pocket, described further below, for receiving the medical information sheet 225. According to certain embodiments, the strap 130 is marked with an indicator, e.g. a "+", to indicate presence of the medical information sheet 225.

As will be readily understood by a person skilled in the art, alternative embodiments can includes a rotational element that includes an annular channel in which one or more protrusions of a base can travel. Similarly, the rotational element 115 need not have the annular protrusion 210, but instead one or more protrusions can be present which restrict movement of the rotational element to rotation within the annular channel 205.

Figure 4A:
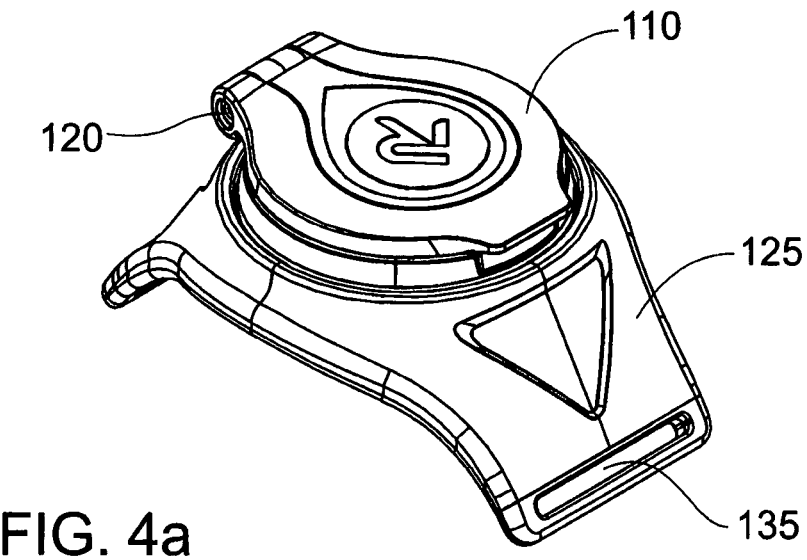
FIG. 4a illustrates a top perspective view of the wearable reflective device of FIG. 1.
Figure 4B:
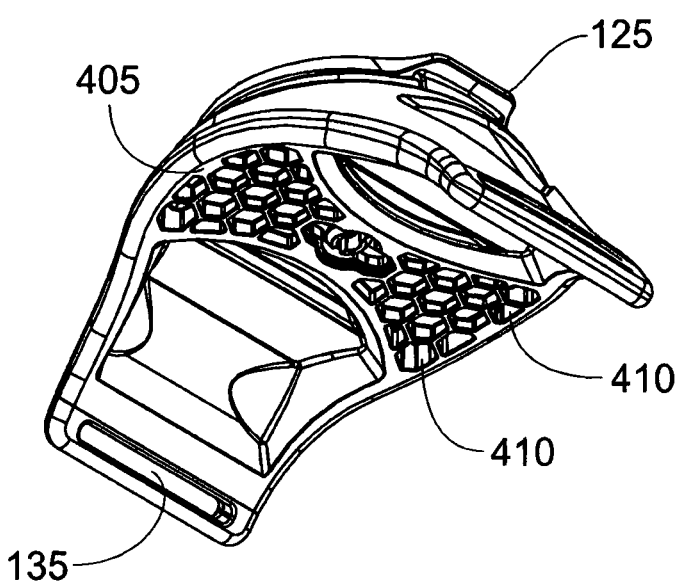
FIG. 4b illustrates a bottom perspective view of the wearable reflective device of FIG. 1.

FIG. 4a illustrates a top perspective view of the wearable reflective device 100, and FIG. 4b illustrates a bottom perspective view of the reflective device 100, according to an embodiment of the present invention.

A lower surface 405 of the base 125 is honeycomb shaped and forms a plurality of hexagonal apertures 410, which reduces weight while maintaining strength and rigidity of the wearable reflective device 100. Furthermore, the hexagonal apertures 410 allow for air to flow through and under the base 125, preventing moisture from being trapped under the base 125.

The lower surface 405 of the base is curved to fit to a curve of a users arm. The curvature of the lower surface 405 also provides stability to the wearable reflective device 100 when worn.

Figure 5A:
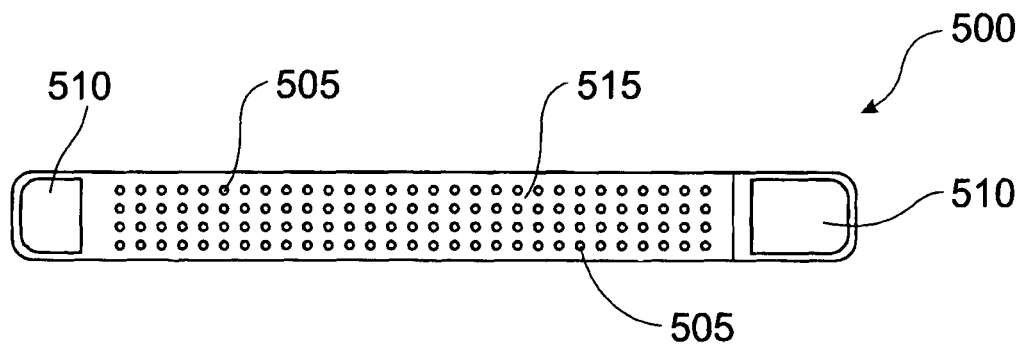
FIG. 5a illustrates a top view of a strap of the wearable reflective device of FIG. 1.
Figure 5B:
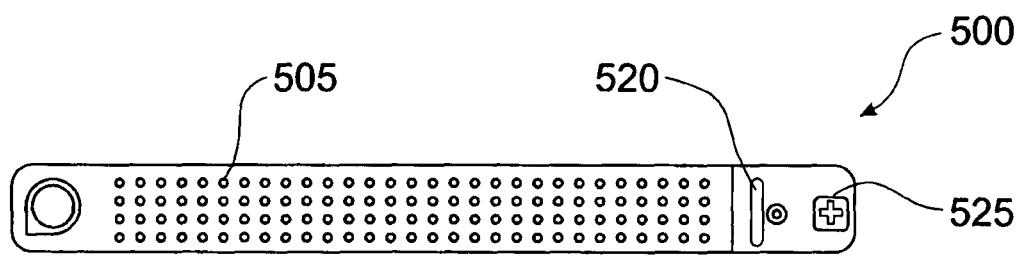
Figure 5C:
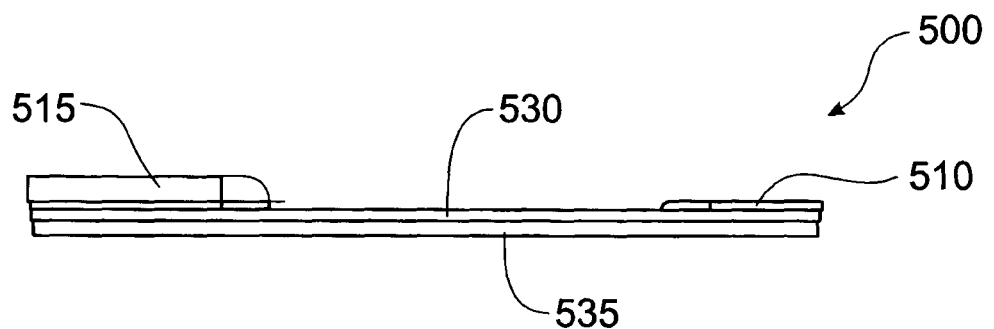

FIG. 5a illustrates a top view of a strap 500, FIG. 5b illustrates a bottom view of the strap 500 and FIG. 5c illustrates an enlarged side view of an end portion of the strap 500, according to an embodiment of the present invention.

Referring to FIG. 5a, the strap 500 comprises a plurality of perforations 505, for providing further breathability to the strap 500.

The strap comprises a hook fastener layer 510 at each end of the strap 500 and a loop fastener layer 515 in a central portion of the strap 500. Hooks of the hook fastener layer 510 attach to loops of the loop fastener layer 515, as is well understood in the art of hook and loop fasteners.

The hook fastener layer 510 can comprise, for example, APLIX 946 Micro Mushroom hooks, of APLIX SA, France, and the loop fastener layer 515 can comprise, for example, APLIX 110 Light Knit Loop, similarly of APLIX SA, France.

Referring to FIG. 5b, the strap 500 includes a pocket 520, similar to the pocket described with reference to FIG. 3, for receiving the medical information sheet 225. The pocket 520 is formed between layers of the strap 500, as described further below.

The strap 500 further includes a medical information identifier 525 in the form of a Medical Cross ("+"), which indicates presence of the medical information sheet 225.

Referring now to FIG. 5c, the strap 500 comprises a first layer 530 and a second layer 535. The first layer 530 and the second layer 535 can comprise woven nylon layers which are bonded together, using thermoplastic polyurethane (TPU). According to certain embodiments, the first layer 530 and the second layer 535 comprise different colours.

The pocket 520 comprises an opening between the first layer 530 and the second layer 535. The pocket 520 is advantageously formed when the first layer 530 is bonded to the second layer 535, by leaving a portion of the first layer 530 free of, i.e. not bonded to, the second layer 535, said portion forming the pocket.

As illustrated in FIG. 5c, the hook fastener layer 510 is bonded to the first layer 530 as is the loop fastener layer 515. The first layer 530 and the second layer 535 are each approximately 0.5 mm thick. The hook fastener layer 510 is also approximately 0.5 mm thick, whereas the loop fastener layer 515 is approximately 1.3 mm thick. As will be readily understood by the skilled addressee, other thicknesses may also be suitable/desirable, depending on the particular application.

While the above described wearable reflective device 100 has been described in the context of cycling, a person of skill in the art will readily understand that the wearable reflective device 100 can be used in the context of kayaking, rowing, or any other suitable sport or activity.

In summary, advantages of the present invention include an ability for a cyclist to view an environment behind them, without needing to turn their head or remove focus from their travelling direction for any substantial time, with increased visibility due to reduced vibration, and increased safety. Furthermore, certain embodiments of the present invention enable compact storage of the mirror when not in use, while retaining certain settings, such as angle of use, to enable simple and fast reconfiguration of the mirror when used again. Furthermore, certain embodiments of the present invention enable medical or emergency information to be stored in the device in case of emergency.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

The claims defining the invention are:

1. A wearable reflective device including:
   a mirror;
   a base comprising an annular channel; and
   a strap attached to the base for securing the device to a user;
   the mirror connected to the base by a pivotal element and a rotational element, wherein:
   the pivotal element is configured to allow the mirror to pivot along a first plane, the rotational element comprises one or more annular protrusions configured to fit inside and travel within the annular channel in the base when rotated, thereby enabling the mirror and pivotal element to rotate in a second plane provided by the annular channel, the first plane being substantially orthogonal to the second plane.

2. A wearable reflective device according to claim 1 wherein the strap is adjustable to fit a user.

3. A wearable reflective device according to claim 1 wherein the mirror comprises a polished aluminum surface.

4. A wearable reflective device according to claim 1 wherein the pivotal element comprises a hinge.

5. A wearable reflective device according to claim 1 wherein the base comprises a cavity for receiving the mirror.

6. A wearable reflective device according to claim 1, wherein the strap is attached to the base using a hook and loop fastener and a channel of the base.

7. A wearable reflective device according to claim 1, wherein the strap defines a plurality of apertures, extending from a first side of the strap to a second side of the strap.

8. A wearable reflective device according to claim 1, wherein a lower surface of the base is curved.

9. A wearable reflective device according to claim 1, wherein the base comprises a plurality of hexagonal apertures.

10. The device according to claim 1 wherein the mirror is connected to the base by a coupling member.

11. The device according to claim 1 wherein the rotational element enables 360 degree rotation.

12. The device according to claim 1, further comprising an o-ring separating the base and the rotational element.

13. The device according to claim 1, wherein the annular channel is formed in a perimeter region of a cavity in the base.

14. The device according to claim 1, wherein a user is able to initially set the field of view using both the rotational element and the pivotal element, and wherein the rotational configuration of the device is retained for subsequent use.

15. A wearable reflective device according to claim 1, wherein the strap comprises a sleeve for receiving a medical information sheet.

16. A wearable reflective device according to claim 15, wherein the strap includes an identifier identifying a presence of the medical information sheet.

17. The device according to claim 1, wherein the mirror is fixedly mounted to a cover, wherein the cover is pivotally attached to the rotational element.

18. The device according to claim 17, wherein said pivotal attachment of the cover to the rotational element comprises a hinge.

19. The device according to claim 17, wherein the cover comprises a lip to facilitate lifting the cover.

* * * * *